(12) United States Patent
Semersky et al.

(10) Patent No.: US 7,354,538 B2
(45) Date of Patent: Apr. 8, 2008

(54) CONTAINER MANUFACTURING INSPECTION AND CONTROL SYSTEM

(75) Inventors: Frank E. Semersky, Holland, OH (US); Ronald A. Puvak, Butler, PA (US); Scott W. Steele, Perrysburg, OH (US); Donald Wayne Miller, Waterville, OH (US); William E. Schmidt, Gibsonia, PA (US)

(73) Assignee: Petwall, LLC, Holland, OH (US)

( * ) Notice: Subject to any disclaimer, the term of this patent is extended or adjusted under 35 U.S.C. 154(b) by 0 days.

(21) Appl. No.: 10/560,161

(22) PCT Filed: Jun. 10, 2004

(86) PCT No.: PCT/US2004/018736

§ 371 (c)(1),
(2), (4) Date: Apr. 7, 2006

(87) PCT Pub. No.: WO2005/000558

PCT Pub. Date: Jan. 6, 2005

(65) Prior Publication Data

US 2006/0214321 A1    Sep. 28, 2006

Related U.S. Application Data

(60) Provisional application No. 60/477,225, filed on Jun. 10, 2003.

(51) Int. Cl.
*B29C 49/78* (2006.01)

(52) U.S. Cl. ............... 264/40.1; 264/523; 425/141; 425/522; 425/538

(58) Field of Classification Search ............ 264/40.1, 264/523; 425/141, 522, 538
See application file for complete search history.

(56) References Cited

U.S. PATENT DOCUMENTS

| | | |
|---|---|---|
| 5,259,716 A | 11/1993 | Hoshino et al. |
| 5,665,399 A | 9/1997 | Enderby |
| 5,772,951 A | 6/1998 | Coxhead et al. |
| 6,186,760 B1 | 2/2001 | Latham |
| 6,863,860 B1 | 3/2005 | Birckbichler et al. |
| 2005/0127572 A1 | 6/2005 | Birckbichler et al. |

FOREIGN PATENT DOCUMENTS

| | | |
|---|---|---|
| EP | 1 175 990 A1 | 1/2002 |
| WO | WO 01/65204 A1 | 9/2001 |

*Primary Examiner*—Suzanne E. McDowell
(74) *Attorney, Agent, or Firm*—Fraser Clemens Martin & Miller LLC; Donald R. Fraser

(57) ABSTRACT

A system and a method for controlling a container manufacturing machine include a thickness monitor (10) for determining an average wall thickness of containers produced by the machine. The system uses the average wall thickness to adjust machine control to change operation of the machine and adjust the quality of the containers being produced. The system also responds to feedback from pneumatic devices (104), heaters (103), mechanical devices and temperature sensors (108, 109) to determine corrections to be made to the machine operation.

15 Claims, 3 Drawing Sheets

CONTAINER MANUFACTURING INSPECTION AND CONTROL SYSTEM

CROSS-REFERENCE TO RELATED APPLICATION

This application claims the benefit of U.S. provisional patent application Ser. No. 60/477,225 filed Jun. 10, 2003.

BACKGROUND OF THE INVENTION

1. Field of the Invention

This invention relates to an apparatus and method for manufacturing plastic containers and, more particularly, to systems and methods for inspecting blow molded plastic containers which vary in quality from one of a myriad of parameters.

2. Description of the Prior Art

Blow molding of plastic containers and other products is a well-known manufacturing process which typically commences with a heated thermoplastic preform disposed in a mold and caused to be filled with a pressurized fluid such as flow air to expand the preform to the shape of the interior of the associated mold. The pressure within the preform typically commences at approximately 70 psi and reaches approximately 550 psi during the blow cycle.

Even though the wall thickness of the container being formed is designed to be relatively constant at any location on the container from cavity to cavity, the wall thickness of the finished container often times will vary from the desired thickness which may render the completed container unsatisfactory for commercial use. Because such defects are often not discovered until receipt by the customer and the filling thereof with a product, it is an important objective of the present invention to identify any variance from the standard during the blow molding process of the formation of the container.

It is to be noted that the trend toward decreasing the wall thickness and the overall weight of the finished container tends to exacerbate the aforementioned problem.

SUMMARY OF THE INVENTION

Accordingly, it is an objective of the present invention to produce a system for monitoring the quality of a plastic container formed by a blow molding process.

Another objective of the invention is to produce a system for monitoring the process for blow molding plastic containers wherein variations in the wall thickness of the containers being formed are sensed and fed back to control the blow molding process.

The present invention concerns a container manufacturing system for the production of blow molded containers comprising: a container manufacturing machine having devices operating on a preform to produce a container; a machine control means connected to the devices for controlling the devices; a thickness monitor for generating a thickness signal representing an average wall thickness of the container produced by the container manufacturing machine; and a system control connected to the thickness monitor and being responsive to the thickness signal for generating a control signal, the system control being connected to the machine control means, the control signal being used by the machine control means for adjusting operation of the devices based upon the average wall thickness. The devices include at least one of a pneumatic device, a heater and a mechanical device.

The present invention also concerns a method of controlling the production of blow molded containers including the steps of: a) producing a container in a container manufacturing machine; b) transporting the container from the container manufacturing machine; c) sensing a combined wall thickness at a location on the container and generating a signal representing an average wall thickness at the location on the container; and d) adjusting operation of the container manufacturing machine in response to the signal to effect the production of subsequent containers. The method further can include performing steps a) through c) for a predetermined number of containers before performing step d).

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
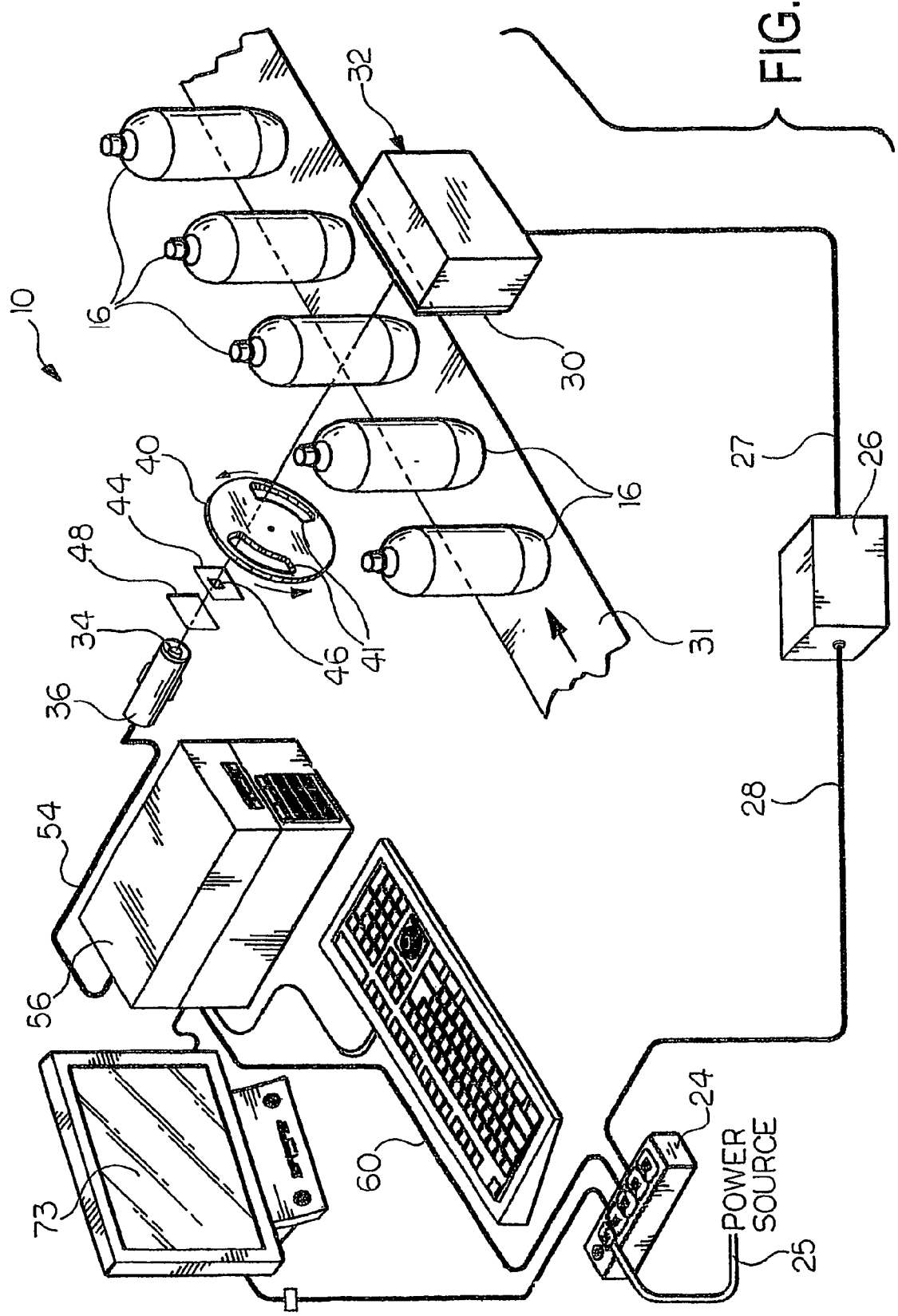
FIG. 1 is a schematic view of a wall thickness measuring apparatus utilized in the inspection and control system according to the present invention.

In FIG. 1 there is shown generally at 10 a plastic container wall thickness measuring apparatus as described in International Patent Application PCT/USO1/06012 filed Feb. 23, 2001, which application is incorporated herein by reference. The apparatus 10 is utilized to measure the wall thickness of a plastic container 16, such a polyethylene terephthalate (PET), blow molded bottle. An electrical distribution box 24 is coupled to a power source (not shown) by a first flexible power cord 25. The bulbs (not shown) are coupled to a direct current (DC) power converter 26 by a second flexible power cord 27. The DC power converter 26 is then coupled to the distribution box 26 by a third flexible power cord 28. The electrical distribution box 24 provides the voltage necessary to power the bulbs.

At least one dense light diffuser 30 is disposed opposite a reflector (not shown) in the optical path of the light energy generated by the bulbs, and forms one wall of an enclosure 32. Preferably, two or more diffusers 30 are used. The enclosure 32 encloses the bulbs and the reflector on all sides such that the light energy is directed only through the diffuser 30.

The diffuser 30 provides an area of uniform diffuse light, and is preferably positioned within the range of from about four to seven inches a sensor 34. The diffuser 30 is configured to be of a height suitable to direct light energy through the maximum height of the plastic container 16 to be inspected, and preferably between one and 1.5 times wider than the width of the container 16 to be measured. Preferably, the light diffuser is within the range of from about three to about four inches wide, and from about five to about eight inches high.

The container 16 is typically carried on a conveyor 31 of a plastic container manufacturing machine, such as an exit conveyor of a machine for blow-molding plastic containers, and caused to travel between the emitter assembly and the sensor assembly at a uniform velocity. The containers 16 will typically travel at a rate of from about two to about twenty containers per second. Although the measuring apparatus 10 is shown associated with an exit conveyor of a machine for blow-molding plastic containers, the apparatus 10 can be used during any stage of the plastic container manufacturing process. For example, the apparatus 10 can be incorporated within a plastic container manufacturing machine, or can be used off-line.

The sensor assembly further includes a sensor 34 for receiving the light energy emitted by the bulbs. The sensor 34 must be sensitive to light energy within the range of from about 2.40 to about 2.50 microns. For example, sensors 34 made of lead sulfide (PbS) or lead selenide (PbSe) are sensitive within the range of from about 2.40 to about 2.50 microns. Preferably, the sensor 34 is made of PbS having a fast chemistry, the PbS sensor material being doped to enhance speed rather than sensitivity. Additionally, sensors made from PbS or PbSe are advantageous because they can be made in a small size, and have a simple electrical operation.

Although sensors 34 made from PbS and PbSe can experience both short term and long term drift in the required IR sensitivity range, both problems can be minimized or eliminated. The temperature of the sensor 34 can be controlled by a cooling means, such as, for example, a thermoelectric cooler (not shown), thereby eliminating the long-term drift, while computer monitoring of the clear light path sensitivity can compensate the short-term drift. Preferably, the thermoelectric cooler will cause the sensor 34 to operate at about sixty-five degrees Fahrenheit, however operating temperatures as low as minus fifty degrees Fahrenheit may be achieved.

It is important that reflection of the diffuse IR light energy from the front surface of the sensor 34 not be directed back at the container 16. Such a reflection can then be again reflected from the surface of the container 16 and produce an error in the measurement. Although the front surface of the sensor 34 can be coated with a material which absorbs the light energy, such absorption will result in an undesirable increase in the heat load on the sensor 34. Therefore, it is more advantageous to construct the sensor 34 having a highly reflective surface, but having a surface angled such that any reflected light energy is directed away from the container 16. The sensor 34 is disposed in a sensor enclosure 36.

A generally annular and planar chopper wheel 40 is disposed adjacent to the container 16 and on the opposite side of the container 16 from the diffuser 30. The chopper wheel 40 is impermeable by IR light energy, and can be made of any rigid material, such as aluminum or plastic. The chopper wheel 40 includes a plurality of circumferentially extending elongated slots 41. In the preferred embodiment two slots 41 are illustrated. However, it will be understood that the chopper wheel 40 may include more than two slots 41. The chopper wheel 40 is caused to rotate by an electric drive motor (not shown). The slots 41 in the chopper wheel 40 are arranged so that the light energy emitted by the bulbs, in the direction of sensor 34, will be interrupted as the chopper wheel 40 rotates. The drive motor causes the chopper wheel 40 to rotate at a high speed such that the light energy passing through the container 16 is interrupted by the chopper wheel 40 within the range of from about ten to about five hundred times per second. Preferably, the rate of light energy interruption is within the range of from about two hundred to about three hundred times per second. In the alternative, the chopper wheel 40 can disposed on the other side of container 16 between the container 16 and the light source 32.

A plate 44 is disposed between the chopper wheel 40 and the sensor 34. The plate 44 includes an aperture 46 for limiting the area of the container 16 from which light energy can pass to the sensor 34, thereby limiting the area of the container 16 from which the wall thickness can be measured. In the embodiment illustrated, the aperture 46 has a generally rectangular shape, each side having a length within the range of from about two to about ten millimeters. The size of the aperture 46 limits the size of the area of the container 16 walls that can be measured and averaged to an area less than three hundred square millimeters. Preferably, the aperture 46 is a square shaped aperture having six millimeter sides, and is located within the range of from about one to about four inches from the sensor 34.

A narrow band pass light filter 48 is located between the plate 44 and the sensor 34. Preferably, the filter 48 is located as close as about one inch from to the sensor 34 so as to prevent stray, unfiltered light from reaching the sensor 34. The filter 48 blocks all light energy not within an absorption band equal to the absorption band of the molecular structure of the resin used to manufacture the container 16. For PET resin, for example, a desirable absorption band occurs at about 2.44 microns. At 2.44 microns, the absorption band is largely insensitive to water vapor or other volatile materials which can be absorbed by the resin. Although a desirable absorption band for PET resin occurs at about 2.44 microns, other absorption bands can be used in the invention. For example, absorption bands of about 2.92 microns or about 1.62 microns may also be selected and used.

Preferably, a thin film interference filter will be used to provide the best narrow band pass with a high transmission in the desired IR range of about 2.40 to about 2.50 microns. The filter 48 must be large enough to prevent any light energy from passing around the edges thereof, and to allow only filtered IR light energy to arrive on the sensor 34. Although in the embodiment illustrated the filter 48 is located between the plate 44 and the sensor 34, it is understood that the filter 48 can be placed anywhere between the bulb and the sensor 34.

The signal from the sensor 34 is coupled by a shielded, low noise line 54, such as a twisted-wire pair, or a terminated coaxial cable, to a computer 56. The computer 56 is coupled to the electronic distribution box 24 by a fourth flexible power cord 60. Prior to being processed by the computer 56, the analog signal from the sensor 34 is converted to a digital signal by a digital signal converter disposed within the computer 56.

The plastic container wall thickness measuring system 10 operates by directing the sensor 34 toward a facing outer surface of the container 16. The uniform diffuse IR light emitted through the diffuser 30 passes through two wall areas of the container 16 and to the sensor 34. The diffuse light washes out the dark spots which can occur due to bumps, stria, and other irregularities in the sidewalls of the container 16. Further, the container 16 of a typical blow molding operation tends to have a uniform circumferential wall thickness. However, wall thickness variations in the vertical axis of such a container 16 are difficult to control. The wall thickness in the vertical axis is therefore frequently not uniform. By measuring the optical absorption of the IR light energy through two wall areas of the container 16, at a wavelength which corresponds to the molecular absorption band of the container resin, and after correcting for variations in geometry and reflection, a valid and accurate value for the average thickness of the two wall areas can be calculated. Simply dividing the two-wall value by two gives an average value for single wall thickness.

From the light intensity data received during each chop cycle, the computer 56 selects and averages from about five to about seven of the light readings having the highest intensity, and selects and averages from about five to about seven of the dark readings having the lowest intensity. The average of the dark readings is then subtracted from the average of the light readings to result in an average intensity value for each chop cycle. Preferably, within the range of from about ten to about fifty such intensity values will be determined for each container 16 as each container passes between the emitter assembly and the sensor assembly.

The computer 56 then stores the value received, and preferably selects and averages from about three to about six of the highest intensity values from the about ten to about fifty values to result in an average intensity value for each container. The computer 56 next compares the average intensity value for each container with stored measurement standards. Based on the stored measurement standards, the computer 56 then accepts or rejects each container 16, and displays the inspection result on a computer monitor 73.

Because the sensors 34 can be quite small, it is also possible to stack a plurality of sensor assemblies vertically to obtain multiple thickness measurements at different positions along the vertical axis of the container 16. Such a stack of sensor assemblies can be used to constantly check a critical location on the container 16 and monitor vertical wall thickness distribution.

It has been found that the average wall thickness values obtained by the method of this invention agree very closely with manual measurements made by carefully sectioning and physical gauging of plastic containers.

Another advantage of this method is that the optical wall thickness measurement apparatus 10 can be installed on the output conveyor of a high speed blow molding machine to measure the average wall thickness at one or more predetermined heights on every container 16.

Another advantage of this method is that the optical wall thickness measurement system 10 can be installed within a high speed blow molding machine to measure the average wall thickness at one or more predetermined heights on every container 16.

A further advantage of this method is that the optical wall thickness measurement apparatus 10 can make thickness measurements of both sidewalls on each container simultaneously.

Yet another advantage of this method is that multiple wall thickness measurements can be taken while the high-speed blow molding machine is operating at full production speed. These data are displayed on the computer monitor 73, and are thereby readily accessible to the machine operator. Data trends are clearly visible, so the operator can anticipate problems before a bad container 16 is produced. The computer system which controls the apparatus 10, and performs the necessary calculations, can also create a time record of the measurements made on the product stream.

Figure 2:
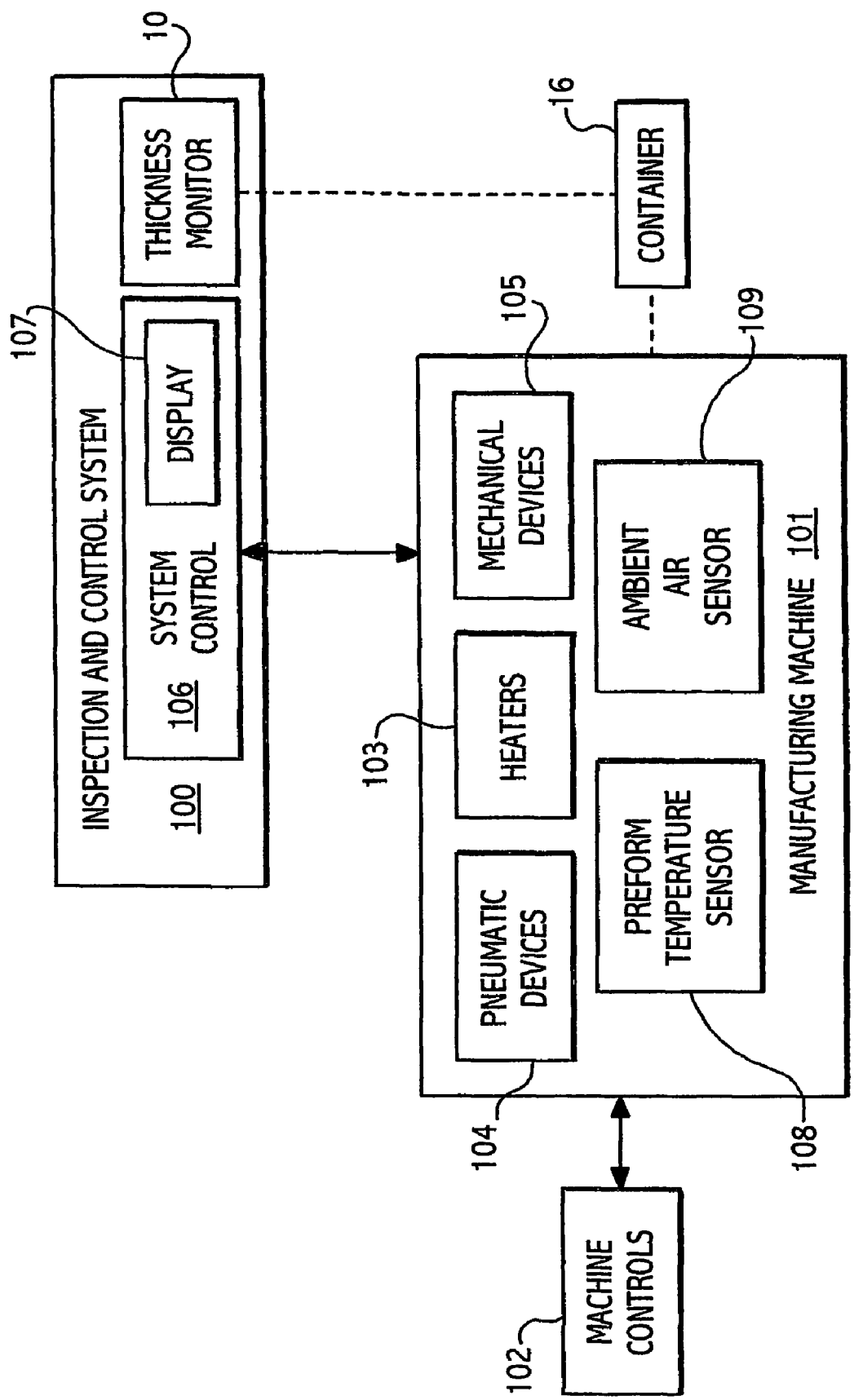
FIG. 2 is a schematic block diagram of a container manufacturing inspection and control system according to the present invention incorporating the wall thickness measuring apparatus shown in FIG. 1.

As shown in FIG. 2, a control and inspection system 100 according to the present invention includes the method and the apparatus 10 for measuring wall thickness as described above. The apparatus 10 is installed downstream from or inside a blow molding machine 101 that produces the plastic (PET) containers 16. These containers 16 may be manufactured with material distribution irregularities. The blowing process employs a combination of machine controls 102 on a plurality of heaters 103 which reheat injection molded preforms to the blowing temperature as well as air pressure device functions 104 and mechanical device functions 105 used to stretch the preform into the blow mold configuration. The control and inspection system 100 includes a system control 106 connected to the thickness monitor 10 to monitor the material distribution, connected to the pneumatic devices 104 and the mechanical devices 105 to monitor the machine functions, and connected to the heaters 103 to monitor temperature trends.

Information obtained by the system control 106 can be displayed to a machine attendant on display device 107 for observation of real time data and data trends. The system control 106 may also reject the containers 16 if they reach a preset threshold value for any number of monitored variables. This activity produces a large amount of data that must be quickly analyzed and presented in a meaningful format. This data can be used to detect and then assist in controlling the production process. This data can be fed back to the blow molding system machine controls 102 as well as be used to alert the machine attendant to other corrective action which may need to be taken. This action can be initiated through manual means (human interaction) or through some automated method (such as software based solutions). Material distribution defects may be correlated with the plurality of blowing mold stations employed on typical production machines.

The feedback control according to the present invention will generate the required recommended process control functions. These controls will allow for better process monitoring, less need for labor to intervene in the process, less random variation in the product, and lower the number of incidents of poor quality product being produced. As will be manifest from the above description, the system 100 is capable of gathering data including wall thickness measurements on the finished product as well as process variables which affect product quality and such information is displayed in a simple and easy to understand format. The data is then interpreted and fed back as control signals to the machine controls 102 of the blow molding machine 101. The control and inspection system 100 or a software interface associated with the machine controls 102 can either alert the attendant of the corrective actions to be taken, or it can automatically begin a systematic correction of the process. Thickness and process data will be continually monitored and this will allow the feedback control to make incremental corrections as needed.

The system 100 may only acquire thickness data and use it for feedback control of the temperature profile, or other machine parameters. Likewise, the system 100 may acquire combinations of thickness, mold correlation, preform temperature, process temperature, and/or pressure profile to use for feedback control purposes. It will be understood that the thickness data can be used with other acquired data to improve the control algorithm. Such other acquired data might include, but is not limited to, air pressure at the devices 104, preform temperature from a sensor 108 (may be a plurality of such sensors distributed about the preform profile), ambient temperature from a sensor 109, and cam control positions from the mechanical devices 105.

The inspection and control system 100, the manufacturing machine 101 and the machine controls 102 can be based upon a commercially available blow molding machine such those available from Sidel, Inc. of Norcross, Ga. The Sidel machines use an industrial PC running Windows NT 4.0 which is capable of being modified to operate in accordance with the present invention as described below.

Figure 3:
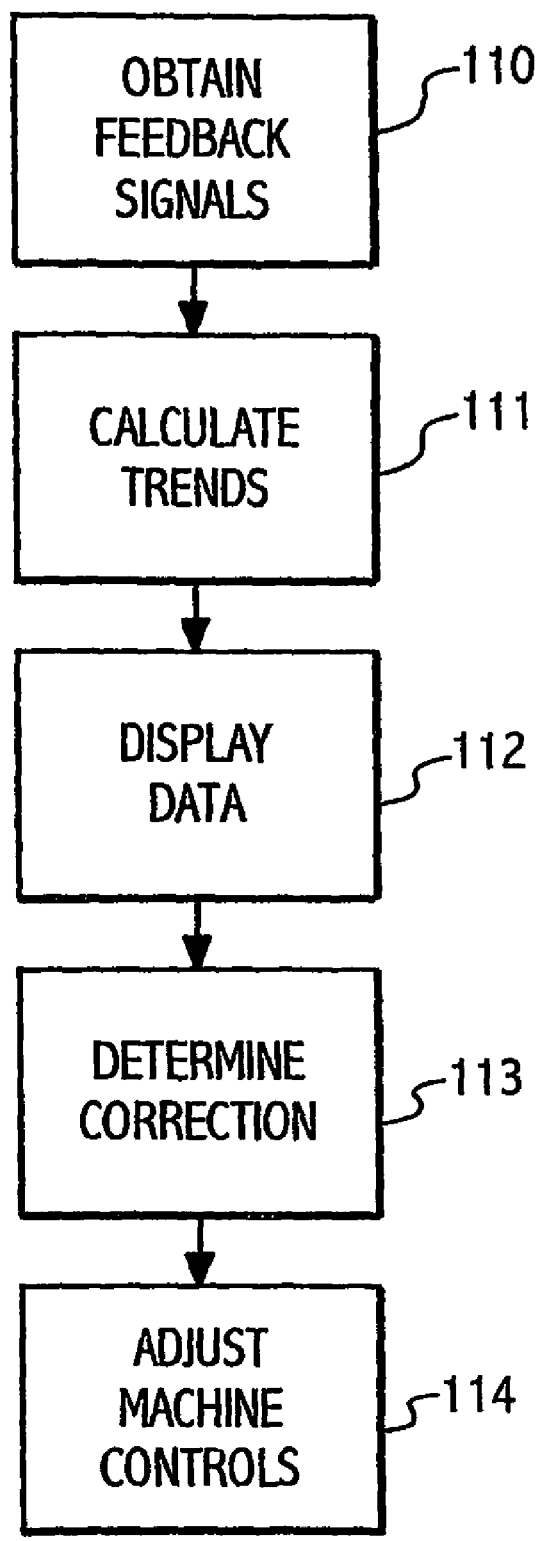
FIG. 3 is a flow diagram of a method of operation of the inspection and control system shown in FIG. 1.

FIG. 3 is a flow diagram of the method of operation of the control and inspection system 100 according to the present invention. In a first step 110, the system 100 obtains the feedback signals from the thickness monitor 10, the heaters 103, the pneumatic devices 104, the mechanical devices 105, the preform temperature sensors 108 and/or the ambient air temperature sensor 109. In a second step 111, the system 100 calculates the trends from the feedback data. The trends can be obtained by averaging the data over a predetermined number of containers. For example, the wall thickness data can be accumulated from a group of one hundred containers passing the thickness monitor 10 and averaged. Comparison of the averages from group to group reveals such information as changes in the wall thickness and whether a machine control change has solved a detected wall thickness problem. In a third step 112, the system 100 displays the data real time. In a fourth step 113, the system 100 determines corrections, if any, to be made to the manufacturing process. The machine 101 is operated by comparing actual data with target data. Several software programs are commercially available that are suitable for accepting the compiled data and directing changes in the operation of the machine based upon the comparison with the target data. For example, the SIGBLOW software is available from the Canadian National Research Council in Montreal, Canada. The HEATaix preform heating software from IKV of Aachen, Germany can be coupled with either the Abaqus (Pawtucket, R.I.) non-linear FEA material model software or the MSC.Software's MSC.Nastran software for blow molding simulation of the heated preform. Yet another program is the BlowView software from JAR Engineering of Kingsport, R.I. A variation of the Virtual Prototyping™ software of Plastic Technologies in Holland, Ohio is the preferred program. In a fifth step 114, the system 100 generates the necessary control signals to adjust the operation of the machine controls 102. Thus, the system 100 can automatically adjust the operation of the manufacturing machine 101 based upon the data obtained from the feedback signals.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A container manufacturing system for the production of blow molded containers comprising:
   a container manufacturing machine having devices operating on a preform to produce a container;
   a machine control means connected to said devices for controlling said devices;
   a thickness monitor for generating a thickness signal representing an average wall thickness of the container produced by said container manufacturing machine; and
   a system control connected to said thickness monitor and being responsive to said thickness signal for generating a control signal, said system control being connected to said machine control means, said control signal being used by said machine control means for adjusting operation of said devices based upon said average wall thickness, wherein said system control responds to feedback signals generated by said devices by adjusting said operation of said devices.

2. The system according to claim 1 wherein said devices include at least one of a pneumatic device, a heater and a mechanical device.

3. The system according to claim 1 wherein said system control includes a display means for visually displaying data related to said thickness signal.

4. The system according to claim 1 wherein said system control responds to feedback signals generated by at least one of a preform temperature sensor and an ambient temperature sensor by adjusting said operation of said devices.

5. The system according to claim 1 including means for generating a pneumatic signal representing air pressure applied to the preform by said container manufacturing machine, said system control being responsive to said pneumatic signal for adjusting operation of said container manufacturing machine.

6. The system according to claim 1 including means for generating a heater signal representing heat applied to the preform by said container manufacturing machine, said system control being responsive to said heater signal for adjusting operation of said container manufacturing machine.

7. The system according to claim 1 including means for generating a mechanical signal representing a mechanical force applied to the preform by said container manufacturing machine, said system control being responsive to said mechanical signal for adjusting operation of said container manufacturing machine.

8. The inspection and control system according to claim 1 including means for generating a temperature signal representing a temperature of the preform, said system control being responsive to said temperature signal for adjusting operation of said container manufacturing machine.

9. The system according to claim 1 including means for generating an ambient temperature signal representing a temperature of air around said container manufacturing machine, said system control being responsive to said temperature signal for adjusting operation of said container manufacturing machine.

10. The system according to claim 1 wherein said system control includes a display means for visually displaying data related to said thickness signal.

11. The system according to claim 1 wherein said system control generates said control signal based upon an average of a predetermined number of said thickness signals each representing an average wall thickness of an associated one of a plurality of containers produced by said container manufacturing system.

12. A method of controlling the production of blow molded containers including the steps of:
   a) producing a container in a container manufacturing machine;
   b) transporting the container from the container manufacturing machine;
   c) sensing a combined wall thickness at a location on the container and generating a signal representing an average wall thickness at the location on the container; and
   d) adjusting operation of the container manufacturing machine with a system control in response to the signal to effect the production of subsequent containers, wherein said steps a) through c) are performed for a predetermined number of contains before performing step d).

13. The method according to claim 12 including calculating a trend based upon the average wall thickness of a predetermined number of the containers.

14. The method according to claim 13 including displaying the trend.

15. The method according to claim 12 including performing said step d) in response to feedback signals from at least one of a pneumatic device, a heater, a mechanical device, a preform temperature sensor and an ambient air temperature sensor.

* * * * *